June 5, 1962 R. HELL ET AL 3,038,024
DEVICE FOR IMPROVING THE RECORDING OF RECEIVED DOCUMENTS IN A FACSIMILE TRANSMITTER
Filed Dec. 24, 1959
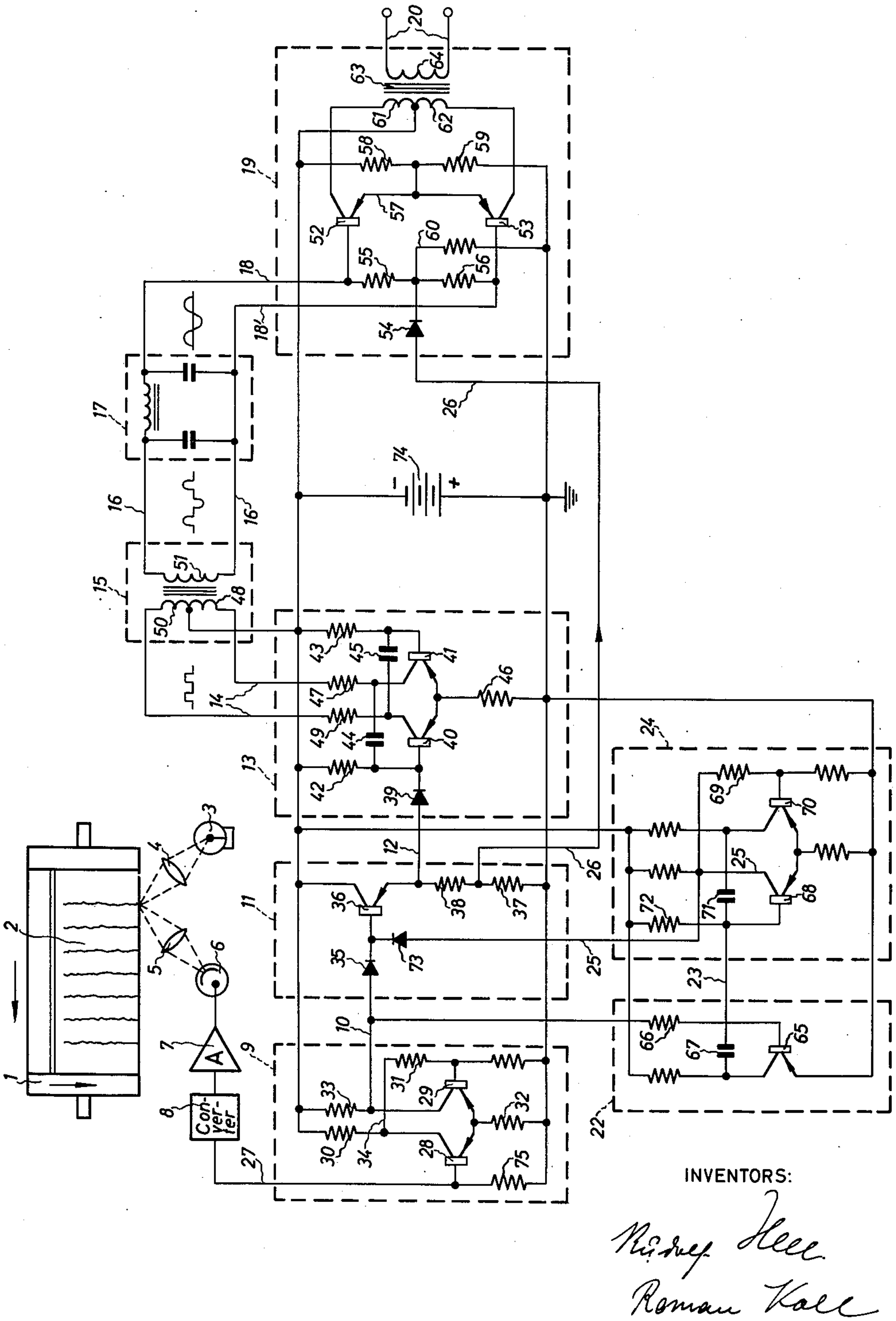
INVENTORS:

United States Patent Office 3,038,024

Patented June 5, 1962

3,038,024

DEVICE FOR IMPROVING THE RECORDING OF RECEIVED DOCUMENTS IN A FACSIMILE TRANSMITTER

Rudolf Hell, Kiel, and Roman Koll, Wellingdorf, Germany, assignors to Dr.-Ing. Rudolf Hell Kommanditgesellschaft, Kiel-Dietrichsdorf, Germany, a German company Filed Dec. 24, 1959, Ser. No. 862,013
Claims priority, application Germany Jan. 3, 1959
2 Claims. (Cl. 178—7.1)

The invention relates to a device for improving the recording of received documents in a facsimile transmitter for the transmission of documents having only two different colors, the occurrence of one of which during photoelectrically scanning a document giving rise to a picture signal causing a carrier frequency voltage to alternatingly switch on and cut off each time the color changes.

In the transmission of pictures not having any half tones, such as line drawings, letters, notes or the like in which only two different colors—i.e., black and white—occur, the method conventional in A.C. telegraphy is used of gating (switching on) a carrier when a black picture element is scanned (or when a white picture element is scanned in the case of negative transmission) so that the picture signals are supplied to the transmission line in the form of a carrier frequency. As a rule, the carrier frequency is produced by means of oscillators which operate continuously during the transmission time—i.e., they are not themselves switched on and off in association with picture signal production; instead, the transmission line is connected to and disconnected from the carrier frequency oscillator. The phase position of the carrier at switching-on and switching-off can be any one and is left to chance yet is not always without some effect on the quality of the received image. For instance, where a black line extending across the scanning direction is to be reproduced, and assuming linewise scanning, the phase position in which the carrier is gated varies in consecutive lines, the extremes being the two passages of the carrier through 0° and 180° and the two passages through the peak voltages at 90° and 270°. If the carrier is just passing through zero when being gated, the receiver signal reaches its full intensity towards 90° because the current is rising or falling from zero. On the other hand, if the carrier is just passing through one of its peaks when being gated, the peak is not usually transmitted, due to phenomena connected with the onset of oscillation in the transmission line and in the receiver; instead, only a fraction of the peak value is transmitted, the carrier having decayed or grown to zero at the transmitter before the transmitted carrier can reach the peak value at the receiver. It must be borne in mind that in facsimile telegraphy, in contrast to A.C. telegraphy where one marking pulse of constant duration is gating a plurality of carrier oscillations, the shortest (smallest) picture dots to be transmitted are gating only a single oscillation or even just a fraction thereof, for the reason that since telephone lines, with their low bandwidth of 3000 c./s., usually have to be used for facsimile transmission, the carrier frequency must be as low as possible—i.e., about 1500 c./s.—so that 3000 picture dots per second can be transmitted.

A result of the changing phase position of the carrier when a transverse line is scanned in consecutive lines is that that edge of such a line which lies in the scanning direction appears mutilated when observed closely, since the receiver current at which the recording system responds is reached within the carrier period in each consecutive recording line at a position slightly different from that correspondng to the original. Such positions are statistically distributed on either side of the true picture edge of the line, depending upon the random phase of the carrier.

To obviate this disadvantage, the invention provides electronic means for switching on the carrier in always the same phase, preferably in one of its two passages through zero.

Other results of the random phase of the carrier in the recording and reproduction of very thin coherent lines which extend transversely of the scanning direction and which consist of picture dots scanned for less than one carrier frequency cycle, is that such thin coherent lines appear interrupted when reproduced because some or many of the dots are not transmitted at all. To obviate this further disadvantage, the invention provides electronic means for switching on the carrier for one and only one full cycle if the picture signal is shorter than is the carrier period.

This step ensures that a thin black line of the original is either reproduced as a coherent and clearly visible line by the receiver, or not at all.

After the scanning of relatively long picture dots or relatively thick lines lasting for more than one period, the carrier must be cut off irrespective of its phase position, otherwise the other edge of the line would be mutilated.

According to another idea of the invention, a circuit is provided in which the electronic means for switching on the carrier in always the same phase and for one full cycle comprise: a photocell connected to a photocell amplifier, a trigger connected to the output of the photocell amplifier of the facsimile transmitter, means whereby said trigger flip-flops into the operative position when the signal voltage exceeds a specified threshold value and flip-flops back into the inoperative position when the signal voltage drops below said threshold value; an automatically reversing delay switch with a reversal time equal to the carrier period, means whereby said delay which is switched on by said trigger each time upon its being energized; an or-gate having two inputs, one input connected to the output of said trigger, the other input connected to the output of said delay switch; a self-oscillating multivibrator generating a square wave voltage and connected to the output of said or-gate, means whereby said multivibrator is switched on and cut off through the agency of said or-gate by said trigger and delay switch each time upon their being energized and deenergized; a filter means connected to the output of said multivibrator for filtering out the higher harmonics from the square multivibrator voltage; and a blocking gate connected to the output of said filter means whereby said blocking gate is controlled by the output of said or-gate for passing the fundamental frequency of said filtered multivibrator voltage to the transmission line.

An embodiment of the invention, to be described in greater detail with reference to a circuit drawing, is illustrated in the drawing which shows the basic transmitter circuit arrangement of a facsimile transmitter comprising the features hereinbefore described. The circuit elements such as triggers, electronic switches, flip-flops, gates, multivibrators occurring in the circuit to be described, are described e.g. in the textbook "High-Speed Computing Devices," published by McGraw-Hill Book Company, Inc., New York, Toronto, London, 1950, Chapters 3 and 4.

Referring to the drawing, a line drawing 2 to be transmitted is wrapped around a rotating cylinder 1 of a facsimile transmitter. The cylinder 1, as it rotates or after each revolution, is advanced axially relatively to the scanning system (to be described hereinafter) so that the original 2 is scanned helically or in equidistant circles. A dot-like light source 3, by means of a focusing system 4, illuminates a small spot on the original 2. The light reflected by the surface of the original 2 is collected by a focusing system 5 concentrated on the cathode of a photocell 6. The photo-cell currents which vary in accordance with the brightness of the original are amplified in a D.C. amplifier 7. The same can be followed by a reversing stage 8 arranged to deliver a large voltage at its output when a black picture element is scanned (the photo-cell receiving little reflected light and therefore producing only a reduced photo current) and a small voltage when a white picture element is scanned (the photocell receiving considerable light and therefore producing a strong photo current). This stage 8 is followed by the trigger 9 consisting of the two transistors 28 and 29, and which flip-flops into the operative position when a negative D.C. voltage applied to its input 27 exceeds a specified threshold value, the trigger 9 flip-flopping back into the inoperative position, when the voltage drops below said threshold value. As long as there is no voltage at the line 27, positive potential being grounded is supplied through the resistor 75 to the base of the transistor 28 which is blocked. Negative potential is supplied through the resistors 30 and 31 to the base of the transistor 29 which becomes conductive. Current runs from the plus-pole of the battery 74 through the resistor 32, the transistor 29, and the resistor 33 to the minus-pole of the battery 74 thereby positive voltage occurring at the collector of the transistor 29 and at the line 10.

If the voltage at the line 27 becomes negative upon scanning a dark portion of the picture, the transistor 28 becomes conductive. Current runs through the resistor 32, the transistor 28 and the resistor 30. By the voltage drop at the resistor 30 the potential at the line 34 approaches the positive ground potential. Positive voltage is supplied to the base of the transistor 29 effecting interruption of the current running through the transistor 29. The collector voltage at the line 10 becomes negative. Negative voltage is supplied through the diode 35 to the base of the transistor 36 of the or-gate 11. The transistor 36 becomes conductive, and current runs from ground through the resistors 37 and 38 and the transistor 36 to the minus-pole.

The emitter of the transistor 36 is connected through the line 12 and the diode 39 to the multivibrator 13 being a bistable electronic flip-flop consisting of the transistors 40 and 41. As long as the multivibrator 13 is not affected by the current through the line 12, it changes between its two instable positions with a frequency being determined by the resistances of the resistors 42 and 43 and by the capacities of the capacitors 44 and 45. However, as long as the transistor 36 of the or-gate 11 is blocked, the base of the transistor 40 is supplied with positive potential through the resistors 37 and 38 and the diode 39. The transistor 40 is blocked whereas the transistor 41 is conductive because its base is connected through the resistor 43 to the minus-pole. Permanent current is running from the plus-pole over the resistor 46, the transistor 41, the resistor 47, the primary half winding 48 of the differentiating transformer 15 to the minus-pole. When the or-gate 11 is being opened the voltage at the emitter of the transistor 36 and at the line 12 becomes negative. Consequently the diode 39 is reversed in its polarity and takes a very high resistance opposite to its conductive direction. Thereupon the connection between the or-gate 11 and the multivibrator 13 is interrupted. The multivibrator 13 starts working in that it changes from the conductive position into the inversed position. It changes permanently its positions between its two instable states with its fundamental frequency which is the carrier frequency required for transmission. Currents run over the resistors 47 and 49 and alternatingly through the primary half windings 48 and 50 of the differentiating transformer 15. The windings being passed in opposite sense, the magnetism of the differentiating transformer 15 is periodically reversed. Pulses of alternating polarity are induced in the secondary winding 51, the pulses being supplied as distorted A.C. voltage through the lines 16 to the low pass filter 17. By agency of this filter the pulses are transformed into sinusoidal A.C. voltage the frequency of which being equal to the multivibrator frequency. This A.C. voltage is supplied through the lines 18 and 18′ to the bases of the transistors 52 and 53.

The potential of the line 26 between the resistors 37 and 38 has become negative by the opening of the transistor 36 of the or-gate 11. This negative voltage is supplied through the diode 54 and the resistors 55 and 56 to the bases of the transistors 52 and 53. The emitters of these two transistors are connected to the line 57 having a portion of negative voltage corresponding to the ratio of the resistances of the two resistors 58 and 59. By suitable dimensioning the resistances of these resistors 58 and 59 and of the resistors 37 and 38 it is effected that the voltage at the line 60 becomes a small rate more negative than the voltage at the emitter line 57 so that the transistors 52 and 53 become conductive. The two primary half windings 61 and 62 of the output transformer 63 are differentially connected so that the switching-on-pulse is compensated and the long distance line 20 is not affected.

The resistors 55 and 56 the resistances of which being equal, divide the A.C. voltage between the lines 18 and 18′ into two inphase-opposed half voltages which become effective at the bases of the transistors 52 and 53 in opposite sense. The collector currents run through the differentially connected primary half windings 61 and 62 of the output transformer 63 and are composed to a common A.C. voltage in the secondary winding 64 of the transformer 63 and in the long distance line 20.

The or-gate 11 has the purpose, firstly, to make start the multivibrator 13 from a defined initial position so that a sinusoidal voltage beginning with its ascendant passage through zero occurs on the lines 18 and 18′ through the differentiator 15 and the low pass filter 17. Secondly, through the line 26, the transistors 52 and 53 of the gate 19 become conductive.

If, after termination of a picture element signal, the voltage at the line 27 drops to positive ground potential, the negative voltage at the line 10 disappears, and the transistor 36 is blocked. The potential of the line 12 becomes positive, and the multivibrator 13 is cut off. At the same time, through the line 26, the diode 54, and the two resistors 55 and 56, the bases of the transistors 52 and 53 become positive. The emitters, however, keep their negative potentials, and the transistors 52 and 53 are blocked. By the suddent blocking of the gate 19 it is prevented that dying-out processes eventually occurring in the filter 17, are supplied to the long distance line 20.

In the moment of switching-on the trigger 9 and of the occurrence of a negative voltage at the line 10, the transistor 65 of the gate 22 becomes conductive over the resistor 66, and its collector becomes positive.

A positive voltage pulse occurs by differentiation in the capacitor 67, the pulse reaching over the line 23 the base of the transistor 68 of the monostable flip-flop 24 being a delay switch. The transistor 68 being conductive in its inoperative position, is blocked, whereby its collector potential becomes negative. Over the resistor 69 this negative voltage is supplied to the base of the transistor 70 which becomes conductive, so that its collector becomes positive. The capacitor 71 is quickly charged to a positive potential over the transistor 70 so that the states of the two transistors 68 and 70 are maintained for the first upon ceasing of the differentiating pulse in the line 23.

The capacitor 71, however, discharges over the resistor 72 after a certain time, and the potential of the line 23 is becoming always more negative until that potential value is reached which makes the transistor 68 conductive. In this moment the delay switch 24 flip-flops back into its stable initial position. The time during which the delay switch remains in its instable position, is determined by the capacity of the capacitor 71 and by the resistance of the resistor 72. This time is to be equal to one full period of the carrier frequency voltage. The collector of the transistor 68 is connected over the line 25 and the diode 73 to the base of the transistor 36 of the gate 11. Negative voltage at the line 25, such as negative voltage at the line 10, makes the gate 11 conductive. The purpose of the gate 22 and the delay switch 24 consists in prolongating the switching-on time of the multivibrator 13 up to a minimum time determined by the reversal time of the delay switch 24, even after an energising time of the trigger 9 being shorter than one full period of the carrier frequency voltage.

The delay switch 24 becomes effective only when a negative voltage occurs at the line 27 the duration of said voltage being shorter than the reversal time of the delay switch 24.

Changes and modifications may be made within the scope and spirit of the appended claims.

What we claim is:

1. In a facsimile transmitter for the transmission of documents having only two different colors the occurrence of one of which during photoelectrically scanning a document giving rise to a picture signal causing a carrier frequency voltage to alternatingly switch on and cut off each time the color changes, a device for improving the recording of received documents, comprising electronic means for switching on the carrier in always the same phase, preferably in one of its two passages through zero, and electronic means for switching on the carrier for one and only one full cycle if the picture signal is shorter than is the carrier period.

2. A circuit according to claim 1, in which the electronic means for switching on the carrier in always the same phase and for one full cycle comprise: a photocell connected to a photocell amplifier, a trigger connected to the output of the photocell amplifier of the facsimile transmitter, means whereby said trigger flip-flops into the operative position when the signal voltage exceeds a specified threshold value and flip-flops back into the inoperative position when the signal voltage drops below said threshold value; an automatically reversing delay switch with a reversal time equal to the carrier period, means whereby said delay switch is switched on by said trigger each time upon its being energized; an or-gate having two inputs, one input connected to the output of said trigger, the other input connected to the output of said delay switch; a self-oscillating multivibrator generating a square wave voltage and connected to the output of said or-gate, means whereby said multivibrator is switched on and cut off through the agency of said or-gate by said trigger and delay switch each time upon their being energized and deenergized; a filter means connected to the output of said multivibrator for filtering out the higher harmonics from the square multivibrator voltage; and a blocking gate connected to the output of said filter means, and means whereby said blocking gate is controlled by the output of said or-gate for passing the fundamental frequency of said filtered multivibrator voltage to the transmission line.

References Cited in the file of this patent

UNITED STATES PATENTS

| | | |
|---|---|---|
| 2,290,823 | Haugh | July 21, 1942 |
| 2,376,034 | Collings | May 15, 1945 |
| 2,657,258 | Hester | Oct. 27, 1953 |
| 2,729,699 | Long | Jan. 3, 1956 |